(12) United States Patent
Mihm, Jr. et al.

(10) Patent No.: US 9,288,043 B1
(45) Date of Patent: Mar. 15, 2016

(54) METHODS AND SYSTEMS FOR PROVIDING HIGH-SECURITY CRYPTOGRAPHIC KEYS TO MOBILE RADIOS

(71) Applicant: MOTOROLA SOLUTIONS, INC, Schaumburg, IL (US)

(72) Inventors: Thomas J Mihm, Jr., Crystal Lake, IL (US); Kenneth C Fuchs, Winfield, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/516,761

(22) Filed: Oct. 17, 2014

(51) Int. Cl.
*H04K 1/00* (2006.01)
*H04L 9/08* (2006.01)
*H04L 9/00* (2006.01)

(52) U.S. Cl.
CPC .............. *H04L 9/0822* (2013.01); *H04L 9/083* (2013.01); *H04L 9/0825* (2013.01)

(58) Field of Classification Search
None
See application file for complete search history.

(56) References Cited

U.S. PATENT DOCUMENTS

| | | | | |
|---|---|---|---|---|
| 6,061,791 A | * | 5/2000 | Moreau | H04L 9/0841 380/283 |
| 7,421,082 B2 | * | 9/2008 | Kamiya | G11B 20/00086 348/E7.056 |
| 2009/0292918 A1 | * | 11/2009 | Mori | G06F 21/31 713/168 |
| 2010/0125739 A1 | * | 5/2010 | Creary | H04L 9/0822 713/189 |
| 2011/0138192 A1 | * | 6/2011 | Kocher | G06F 21/602 713/189 |
| 2012/0300932 A1 | * | 11/2012 | Cambridge | H04L 9/3234 380/270 |

* cited by examiner

*Primary Examiner* — Dede Zecher
*Assistant Examiner* — Trang Doan
(74) *Attorney, Agent, or Firm* — Steven A. May

(57) ABSTRACT

At least one embodiment takes the form of a process carried out by a key-management infrastructure (KMI). The KMI receives first and second disassembly products of a high-security cryptographic key and provides the first and second disassembly products to a mobile radio for reassembly of the high-security cryptographic key. Providing the first disassembly product to the mobile radio includes providing the first disassembly product to the mobile radio over a local connection via a restricted-access key variable loader. Providing the second disassembly product to the mobile radio includes (i) generating a medium-security-encrypted second disassembly product at least in part by encrypting the second disassembly product based on at least one medium-security cryptographic key, and (ii) providing the medium-security-encrypted second disassembly product to the mobile radio over an air interface.

20 Claims, 10 Drawing Sheets

METHODS AND SYSTEMS FOR PROVIDING HIGH-SECURITY CRYPTOGRAPHIC KEYS TO MOBILE RADIOS

BACKGROUND OF THE INVENTION

People communicate wirelessly and on the go. Among the devices that make this possible are those sometimes referred to as mobile two-way radios. Examples of mobile two-way radios include cell phones, smartphones, walkie-talkies, and portable hotspots, among others. A mobile two-way radio could be handheld (as may be the case for a walkie-talkie), body-mounted, or attached to a vehicle (such as the roof of a car), as examples.

Given the relative ease with which radio signals can be intercepted, communication with (or between) mobile radios is often encrypted to prevent interception of the communication by third parties. Encryption is the process of converting readable text or other data (often called "plaintext") into unintelligible text (often called "ciphertext"), while decryption is the process of converting ciphertext back to the original plaintext. The respective algorithms used for encryption and decryption are often referred to collectively as a cipher. Examples of common ciphers include Advanced Encryption Standard (AES), Blowfish, Triple Data Encryption Algorithm (3DES), and RC4, among numerous others.

A given cipher typically uses one or more cryptographic keys for encryption and decryption. Common examples of cryptographic keys include passwords, digital certificates, and random and/or pseudo-random data. Any party (including a third party) with access to a cryptographic key used to encrypt a given plaintext may be able to decrypt the ciphertext; therefore, for encryption to be effective, the cryptographic key should be known only to the sender and receiver. Accordingly, there is a need for securely providing cryptographic keys to mobile radios.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
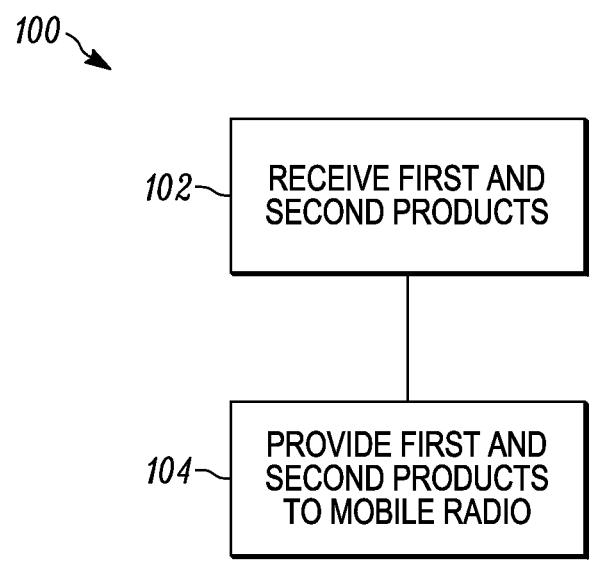
FIG. 1 depicts a flowchart of a first process carried out by a key-management infrastructure (KMI), in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and system for providing first and second disassembly products of a high-security cryptographic key (HS-K) to a mobile radio. At least one embodiment takes the form of a process carried out by a key-management interface (KMI). The KMI receives first and second disassembly products of an HS-K and provides the first and second disassembly products to a mobile radio for reassembly of the HS-K. Providing the first disassembly product to the mobile radio includes providing the first disassembly product to the mobile radio over a local connection via a restricted-access key variable loader. Providing the second disassembly product to the mobile radio includes (i) generating a medium-security-encrypted second disassembly product at least in part by encrypting the second disassembly product based on at least one medium-security cryptographic key (MS-K), and (ii) providing the medium-security-encrypted second disassembly product to the mobile radio over an air interface.

Another embodiment takes the form of a KMI that includes a communication interface, a processor, and data storage containing instructions executable by the processor for causing the KMI to carry out a set of functions that includes at least the functions described in the preceding paragraph. Moreover, any of the variations and permutations described in the ensuing paragraphs and anywhere else in this disclosure can be implemented with respect to any embodiments, including with respect to any method embodiments and any system embodiments.

In at least one embodiment, the KMI takes the form of (or includes) an Association of Public-Safety Communications Officials-International (APCO) Project 25 (P25) key-management facility, and process 100 being carried out by the key-management infrastructure includes the process being carried out by the APCO P25 key-management facility.

In at least one embodiment, the first disassembly product takes the form of (or includes) a random number and the second disassembly product is based on both the HS-K and the random number.

In at least one such embodiment, the second disassembly product takes the form of (or includes) an XOR of the HS-K and the random number.

In at least one embodiment, the KMI confirms that the mobile radio is authorized to receive the HS-K prior to the KMI completing the providing of both the first and second disassembly products to the mobile radio.

In at least one embodiment, the at least one MS-K takes the form of (or includes) a medium-security traffic encryption key (MS-TEK), and encrypting the second disassembly product based on the at least one MS-K includes encrypting the second disassembly product based on the MS-TEK.

In at least one such embodiment, the at least one MS-K further includes a medium-security key encryption key (MS-KEK), and encrypting the second disassembly product based on the MS-TEK includes encrypting the second disassembly product based on both the MS-KEK and the MS-TEK.

In at least one such embodiment, encrypting the second disassembly product based on both the MS-KEK and the MS-TEK includes (i) generating a first encryption result at least in part by encrypting the second disassembly product based on the MS-KEK and (ii) encrypting the first encryption result based on the MS-TEK.

In at least one embodiment, the at least one MS-K takes the form of (or includes) an MS-KEK, and encrypting the second disassembly product based on the at least one MS-K includes encrypting the second disassembly product based on the MS-KEK.

In at least one embodiment, the HS-K takes the form of (or includes) a high-security key encryption key (HS-KEK).

In at least one such embodiment, the KMI (i) receives a high-security traffic encryption key (HS-TEK) that is encrypted based on the HS-KEK, and (ii) provides the high-security-encrypted HS-TEK to the mobile radio over the air interface for decryption by the mobile radio based on the HS-KEK.

In at least one such embodiment, the KMI encrypts the HS-TEK based on at least one MS-K prior to providing the HS-TEK to the mobile radio over the air interface.

In at least one other such embodiment, a radio access network (RAN) includes the KMI. In at least one such embodiment, the RAN (i) receives inbound high-security traffic that is encrypted based on the HS-TEK, (ii) generates medium-security-encrypted inbound high-security traffic at least in part by encrypting the received inbound high-security traffic based on at least one MS-K, and (iii) forwards the medium-security-encrypted inbound high-security traffic over the air interface to the mobile radio. In at least one other such embodiment, the RAN (i) receives medium-security-encrypted outbound high-security traffic (the high-security traffic being encrypted based on the HS-TEK) over the air interface from the mobile radio, (ii) decrypts the received medium-security-encrypted outbound high-security traffic based on at least one MS-K, and (iii) forwards the outbound high-security traffic via a packet-data connection.

In at least one embodiment, the HS-K takes the form of (or includes) an HS-TEK.

In at least one such embodiment, a RAN includes the KMI. In at least one such embodiment, the RAN (i) receives inbound high-security traffic that is encrypted based on the HS-TEK, (ii) generates medium-security-encrypted inbound high-security traffic at least in part by encrypting the received inbound high-security traffic based on at least one MS-K, and (iii) forwards the medium-security-encrypted inbound high-security traffic over the air interface to the mobile radio. In at least one other such embodiment, the RAN (i) receives medium-security-encrypted outbound high-security traffic (the high-security traffic being encrypted based on the HS-TEK) over the air interface from the mobile radio, (ii) decrypts the received medium-security-encrypted outbound high-security traffic based on at least one MS-K, and (iii) forwards the outbound high-security traffic via a packet-data connection.

In at least one embodiment, the KMI, prior to providing the medium-security-encrypted second disassembly product to the mobile radio over the air interface, generates a storage-encrypted second disassembly product and stores the storage-encrypted second disassembly product in a cryptographic key storage. The KMI generates the storage-encrypted second disassembly product at least in part by encrypting the second disassembly product based on a storage cryptographic key. The KMI retrieves the storage-encrypted second disassembly product from the cryptographic key storage and decrypts the storage-encrypted second disassembly product based on the storage cryptographic key.

In at least one embodiment, the mobile radio includes a high-security hardware module, and providing the first and second disassembly products to the mobile radio for reassembly of the HS-K includes providing the first and second disassembly products to the high-security hardware module.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . . " And it is for reasons akin to brevity and clarity of presentation that this implied leading clause is not repeated ad nauseum in this detailed description.

FIG. 1 depicts a flowchart of a process carried out by a KMI, in accordance with at least one embodiment. As shown, process 100 begins at step 102 with the KMI receiving first and second disassembly products of an HS-K. At step 104, the KMI provides the first and second disassembly products to a mobile radio for reassembly of the HS-K.

Figure 2:
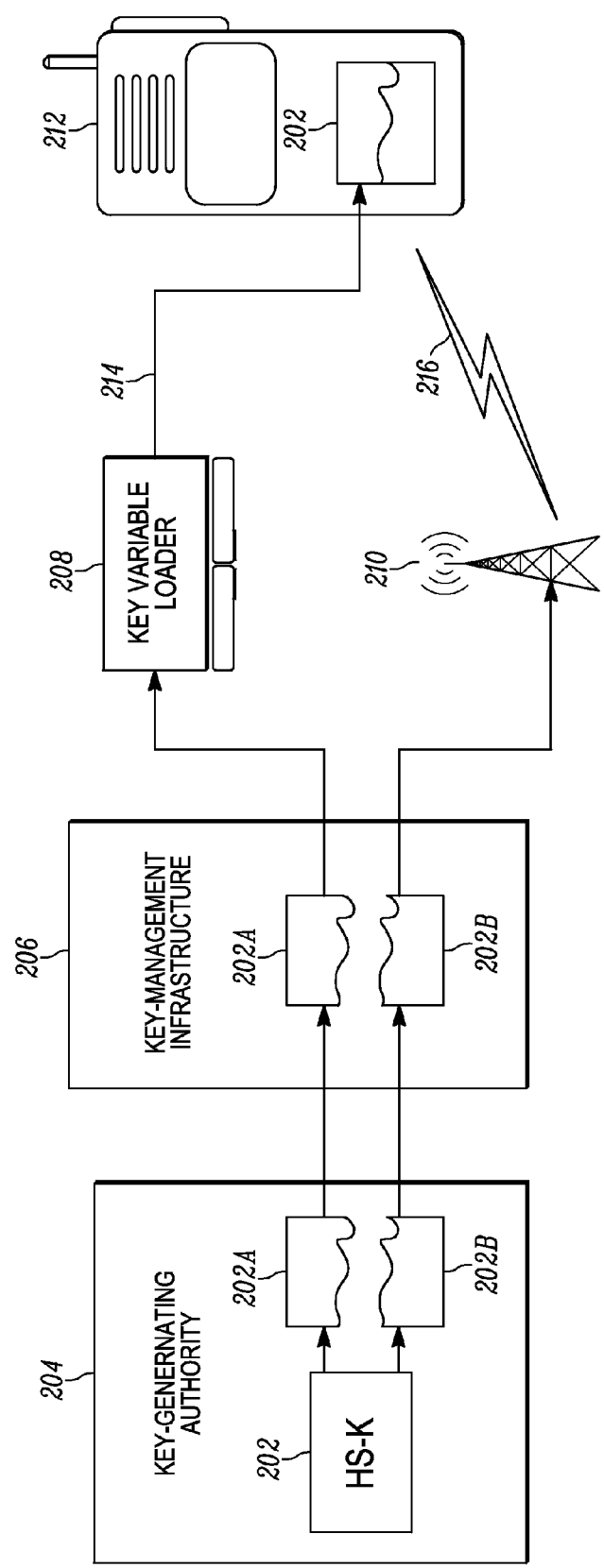
FIG. 2 depicts an example operation of a KMI, in accordance with at least one embodiment.

FIG. 2 depicts an example operation of a KMI, in accordance with at least one embodiment. As shown, a KMI 206 receives first and second disassembly products 202A and 202B (respectively) of an HS-K 202, and provides the disassembly products to a mobile radio 212 for reassembly of HS-K 202.

In the embodiment depicted in FIG. 2, KMI 206 receives first and second disassembly products 202A and 202B (e.g., a first portion and a second, differing portion of the HS-K) from a key-generating authority 204, which in turn both generates HS-K 202 and disassembles HS-K 202 into disassembly products 202A and 202B, perhaps by using one or more "secret sharing" methodologies (sometimes referred to as "secret splitting," "key splitting," and/or "split knowledge"). Those of skill in the art will appreciate that different entities may generate and disassemble HS-K 202 into disassembly products 202A and 202B, and that first and second disassembly products 202A and 202B may be received from different and/or additional entities. In at least one embodiment, first disassembly product 202A takes the form of (or includes) a random number and second disassembly product 202B is based on both HS-K 202 and the random number. For example, second disassembly product 202B could take the form of (or include) an XOR of HS-K 202 and the random number.

First disassembly product 202A is provided to mobile radio 212 over a local connection 214 via a restricted-access key variable loader (KVL) 208. It is noted that access to the restricted-access KVL 208 could be restricted in one or more different ways, as deemed suitable by those of skill in the relevant art for a given implementation or in a given context. Some example ways in which access could be restricted include physically, lock and key, biometric authentication, password protection, security clearance, and the like. Local connection 214 could be a wired connection such as Universal Serial Bus (USB), Ethernet, etc., and/or a short-range wireless connection such as Bluetooth, ZigBee, Wi-Fi, etc., among other possibilities. As shown in FIG. 2, KMI 206 may provide first disassembly product 202A to KVL 208, which in turn may provide first disassembly product 202A to mobile radio 212 over local connection 214.

Second disassembly product 202B is provided over an air interface 216, perhaps according to one or more communication protocols such as P25, Long-Term Evolution (LTE), Global System for Mobile Communications (GSM), and/or CMDA2000, among numerous other possibilities. In at least one embodiment, KMI 206 takes the form of (or includes) a P25 key-management facility, and functions described herein as being carried out by KMI 206 are carried out by the P25 key-management facility. As shown in FIG. 2, KMI 206 may provide second disassembly product 202B to a base station 210, which in turn may provide second disassembly product 202B to mobile radio 212 over air interface 216.

In at least one embodiment, KMI 206 confirms that mobile radio 212 is authorized to receive HS-K 202 prior to completing provision of first disassembly product 202A and second disassembly product 202B to mobile radio 212. KMI 206 could access a database of mobile radios authorized to receive HS-K 202 to determine that mobile radio 212 is so authorized. As another possibility, HS-K 202 could include metadata indicating that mobile radio 212 is authorized to receive the HS-K. Other variations are possible as well.

In at least one embodiment, mobile radio 212 includes a high-security hardware module, and providing first and second disassembly products 202A and 202B (respectively) to mobile radio 212 for reassembly of HS-K 202 including providing the first and second disassembly products to the high-security hardware module. Upon receiving first disassembly product 202A and second disassembly product 202B, mobile radio 212 may reassemble HS-K 202 based on the received disassembly products. Mobile radio 212 may then decrypt data that was encrypted based on HS-K 202, and may likewise encrypt data based on HS-K 202 (for decryption by a recipient with access to HS-K 202). If mobile radio 212 includes a high-security hardware module, the mobile radio may reassemble HS-K 202 using the high-security hardware module, and/or may encrypt and/or decrypt data using the high-security hardware module.

Figure 3:
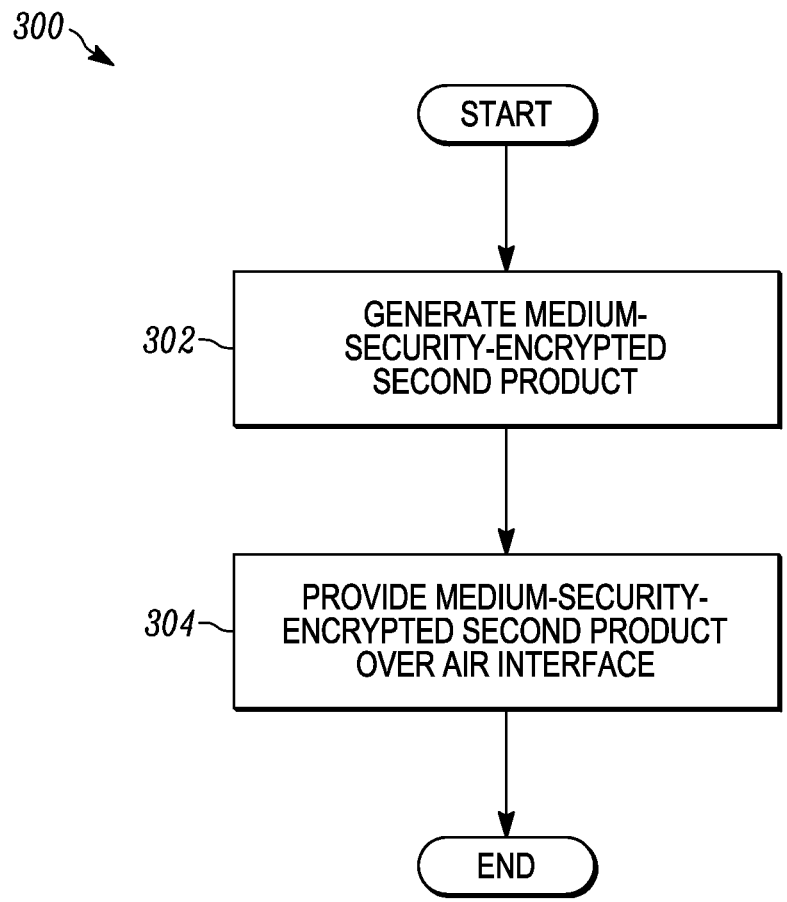
FIG. 3 depicts a flowchart of a second process carried out by a KMI, in accordance with at least one embodiment.

FIG. 3 depicts a flowchart of a process carried out by a KMI, in accordance with at least one embodiment. As shown, process 300 begins at step 302 with a KMI generating a medium-security-encrypted second disassembly product at least in part by encrypting the second disassembly product based on at least one MS-K. At step 304, the KMI provides the medium-security-encrypted second disassembly product to the mobile radio over an air interface.

Figure 4:
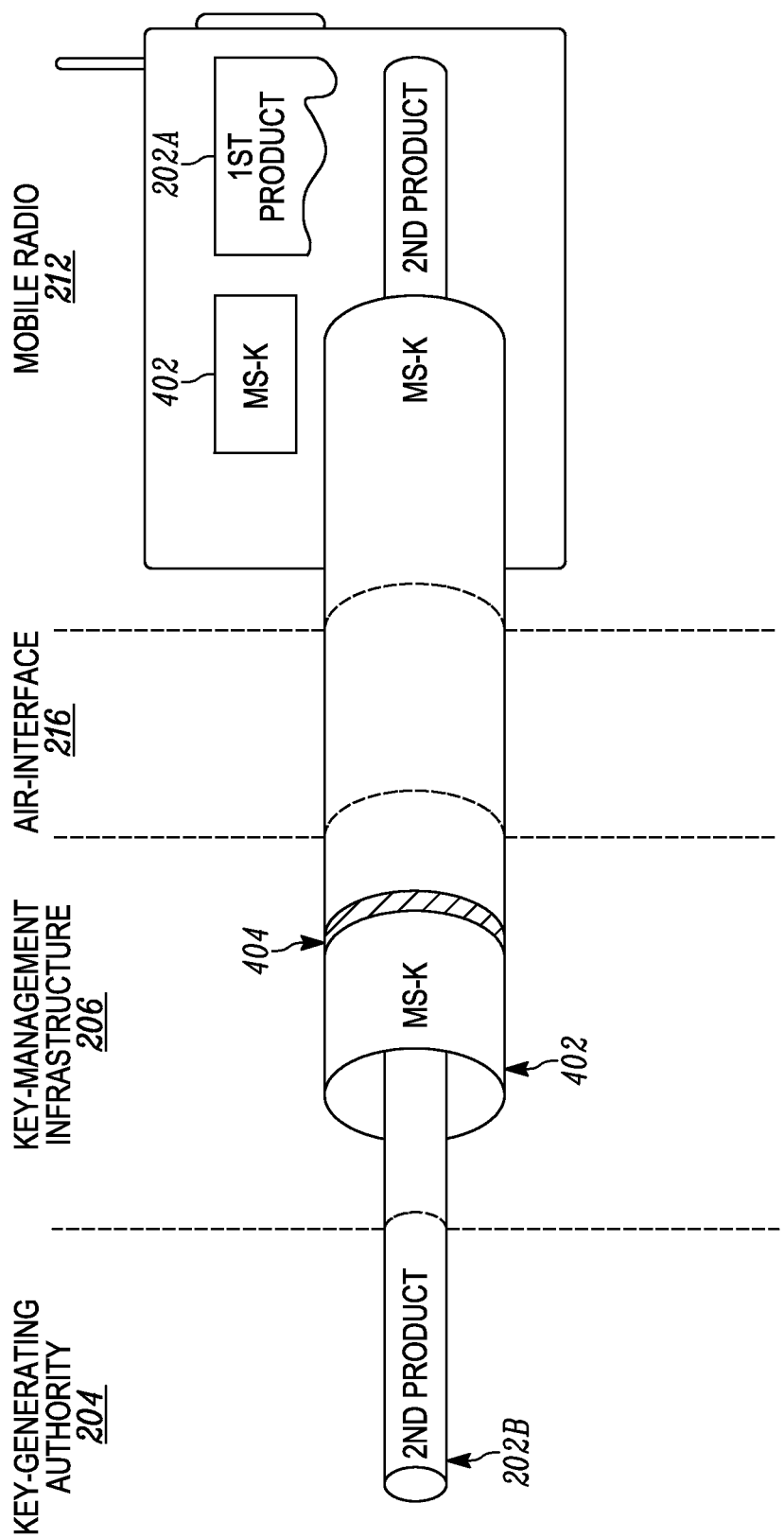
FIGS. 4 through 6 depict examples of a KMI exchanging encrypted data with a mobile radio over an air interface, in accordance with various embodiments.

FIG. 4 depicts an example of KMI 206 providing a medium-security-encrypted second disassembly product to mobile radio 212 over an air interface 216. As shown, KMI 206 receives second disassembly product 202B from key-generating authority 204. KMI 206 then encrypts the received second disassembly product based on at least one MS-K 402, thereby generating a medium-security-encrypted second disassembly product 404, which KMI 206 then provides to mobile radio 212 over air interface 216. Mobile radio 212 may then decrypt medium-security-encrypted second disassembly product 404 based on the at least one MS-K 402 to obtain second disassembly product 202B. As depicted in FIG. 4, mobile radio 212 may store a copy of MS-K 402, first disassembly product 202B, and/or any other received cryptographic keys and/or disassembly products of cryptographic keys. Mobile radio 212 may then encrypt and/or decrypt data based on the one or more stored cryptographic keys.

In at least one embodiment, prior to providing medium-security-encrypted second disassembly product 404 to mobile radio 212 over air interface 216, KMI 206 generates a storage-encrypted second disassembly product at least in part by encrypting second disassembly product 202B based on a storage cryptographic key. KMI 206 then stores the storage-encrypted second disassembly product in a cryptographic key storage. Subsequently, KMI 206 retrieves the storage-encrypted second disassembly product from the cryptographic key storage and decrypts the storage-encrypted second disassembly product based on the storage cryptographic key.

The at least one MS-K 402 could take the form of (or include) an MS-KEK, and encrypting second disassembly product 202B based on the at least one MS-K 402 could include KMI 206 encrypting second disassembly product 202B based on the MS-KEK. As another possibility, the at least one MS-K 402 could take the form of (or include) an MS-TEK, and encrypting the second disassembly product based on the at least one MS-K 402 could include KMI 206 encrypting second disassembly product 202B based on the MS-TEK. As still another possibility, the at least one MS-K 402 could include both an MS-TEK and an MS-KEK, and encrypting second disassembly product 202B based on the at least one MS-K 402 could include KMI 206 encrypting second disassembly product 202B based on both the MS-KEK and the MS-TEK.

Figure 5:
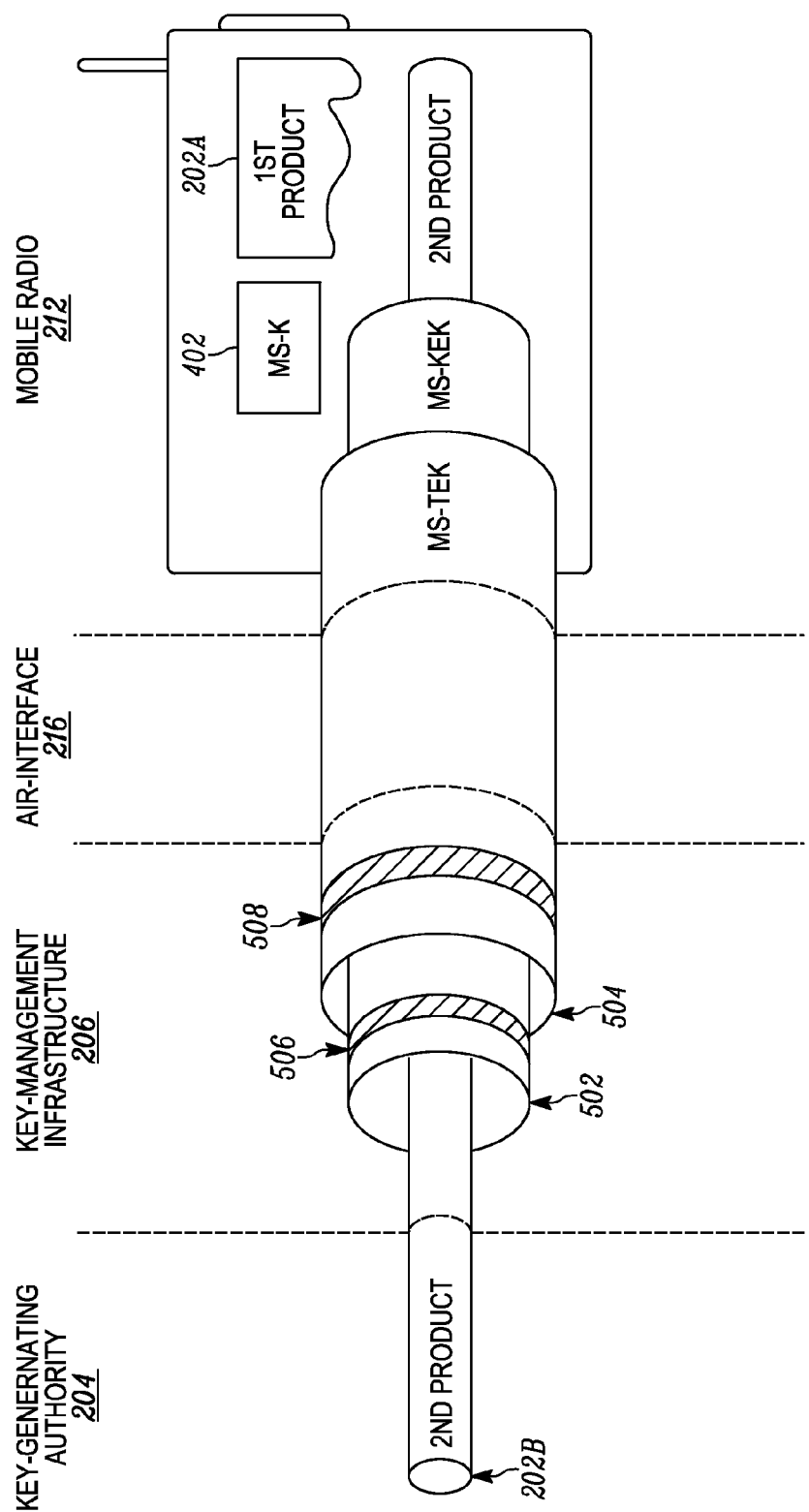

FIG. 5 depicts an example of KMI 206 providing, to mobile radio 212 over air interface 216, a second disassembly product that is encrypted based on both an MS-KEK and an MS-TEK, in accordance with at least one embodiment. As shown, encrypting second disassembly product 202B based on both MS-KEK 502 and MS-TEK 504 includes KMI 206 generating a first encryption result 506 at least in part by encrypting second disassembly product 202B based on MS-KEK 502, and encrypting first encryption result 506 based on MS-TEK 504 to obtain a second encryption result 508. The second encryption result 508 may then be provided to mobile radio 212, which may decrypt the received second encryption result 508 based on MS-TEK 504 to obtain first encryption result 506. The mobile radio may then decrypt the first encryption result based on MS-KEK 502 to obtain second disassembly product 202B.

Figure 6:
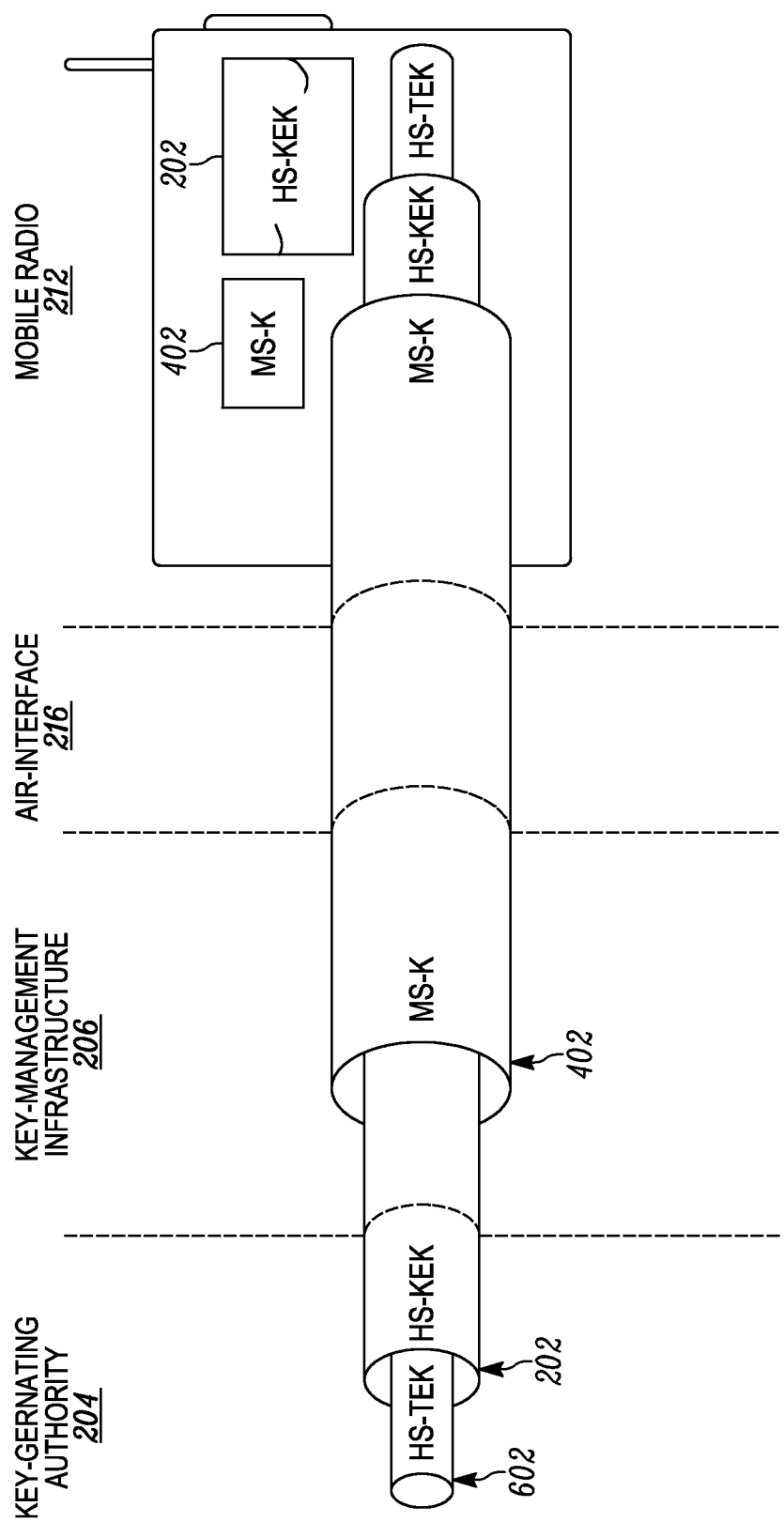

As illustrated in FIG. 6, HS-K 202 may take the form of an HS-KEK. As shown, mobile radio 212 has reassembled HS-K 202 based on received disassembly products 202A and 202B. In at least one embodiment, KMI 206 receives an HS-TEK 602 that is encrypted based on HS-KEK 202, and provides high-security-encrypted HS-TEK 602 to mobile radio 212 over air interface 216 for decryption by mobile radio 212 based on HS-KEK 202. As illustrated, KMI 206 may encrypt high-security-encrypted HS-TEK 602 based on the at least one MS-K 402 prior to providing HS-TEK 602 to mobile radio 212 over air interface 216.

Figure 7:
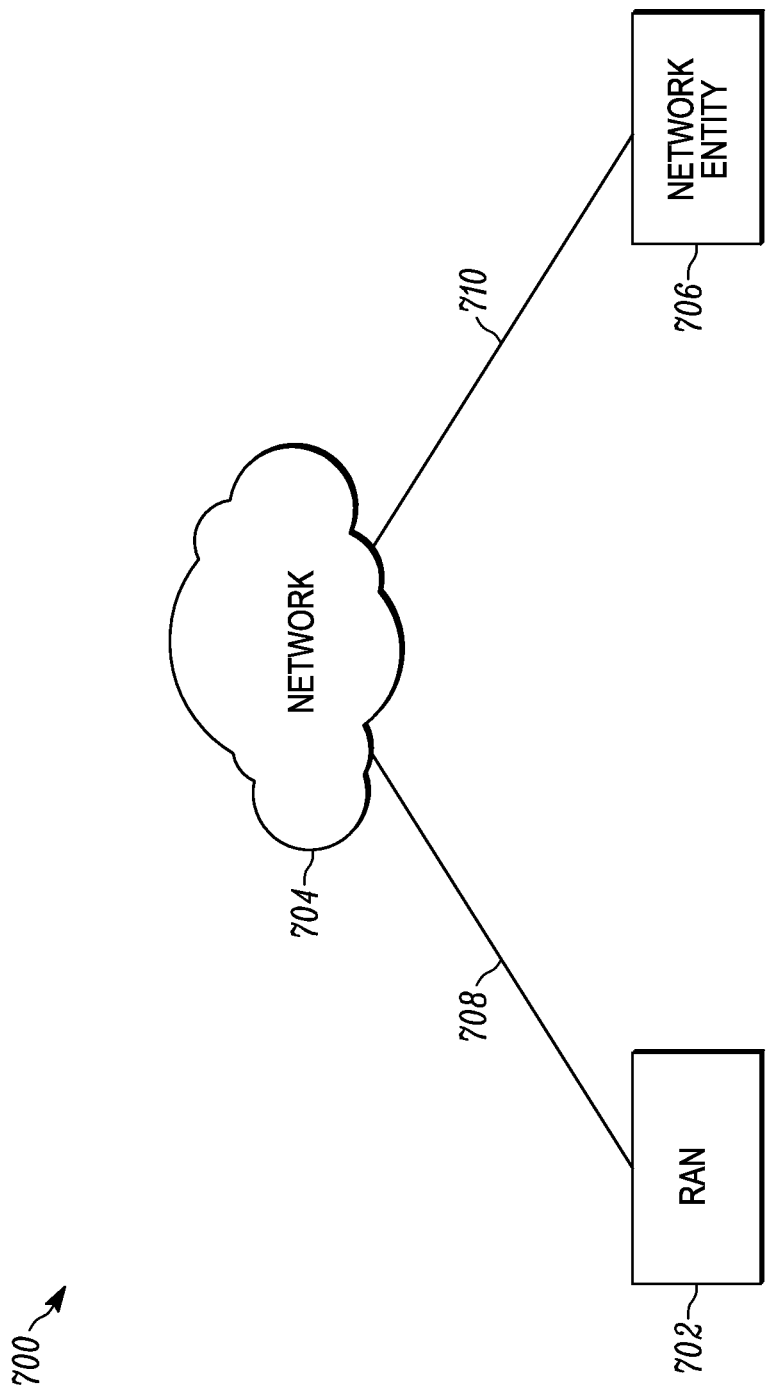
FIG. 7 depicts an example communication system, in accordance with at least one embodiment.

FIG. 7 depicts an example communication system, in accordance with at least one embodiment. In particular, FIG. 7 depicts an example communication system 700 that includes a radio access networks (RAN) 702 and a network entity 706 that are communicatively connected via respective communication links 708 and 710 to a network 704.

An example structure of RAN 702 is described below in connection with FIG. 8, though in general, RAN 702 could be any RAN equipped and configured by those of skill in the relevant art to function as described herein. In different embodiments, a RAN could take the form of or include a base station, a subpart of a RAN, a radio-network switching system, and/or a wireless wide area network (WWAN), as a few representative examples. In various different embodiments, RAN 702 may include one or more elements such as base stations, base station controllers, routers, switches, and the like, arranged, connected, and programmed to provide wireless service to, e.g., mobile radio 212 in a manner that in general is known to those of skill in the relevant art. RAN 702 could take the form of a public-safety radio network and/or a commercial radio network, among other possibilities.

Network 704 could take the form of (or include) a circuit-switched network (such as the Public Switched Telephone Network (PSTN)), a packet-switched network (such as the Internet), and/or any other suitable network or networks. Network entity 706 could take the form of a key-generating authority (such as key-generating authority 204), a mobile radio, another RAN, an entity within RAN 702, and/or any other entity capable of exchanging encrypted and/or non-encrypted data with RAN 702.

Communication links 708 and/or 710 could include one or more communication devices, networks, connections, switches, bridges, routers, and the like. Either or both of communication links 708 and 710 could make use of wired and/or wireless forms of communication. Moreover, one or more communication links instead of and/or in addition to communication links 708 and 710 could be present (such as one or more communication links between RAN 702 and network entity 706, as one example).

Figure 8:
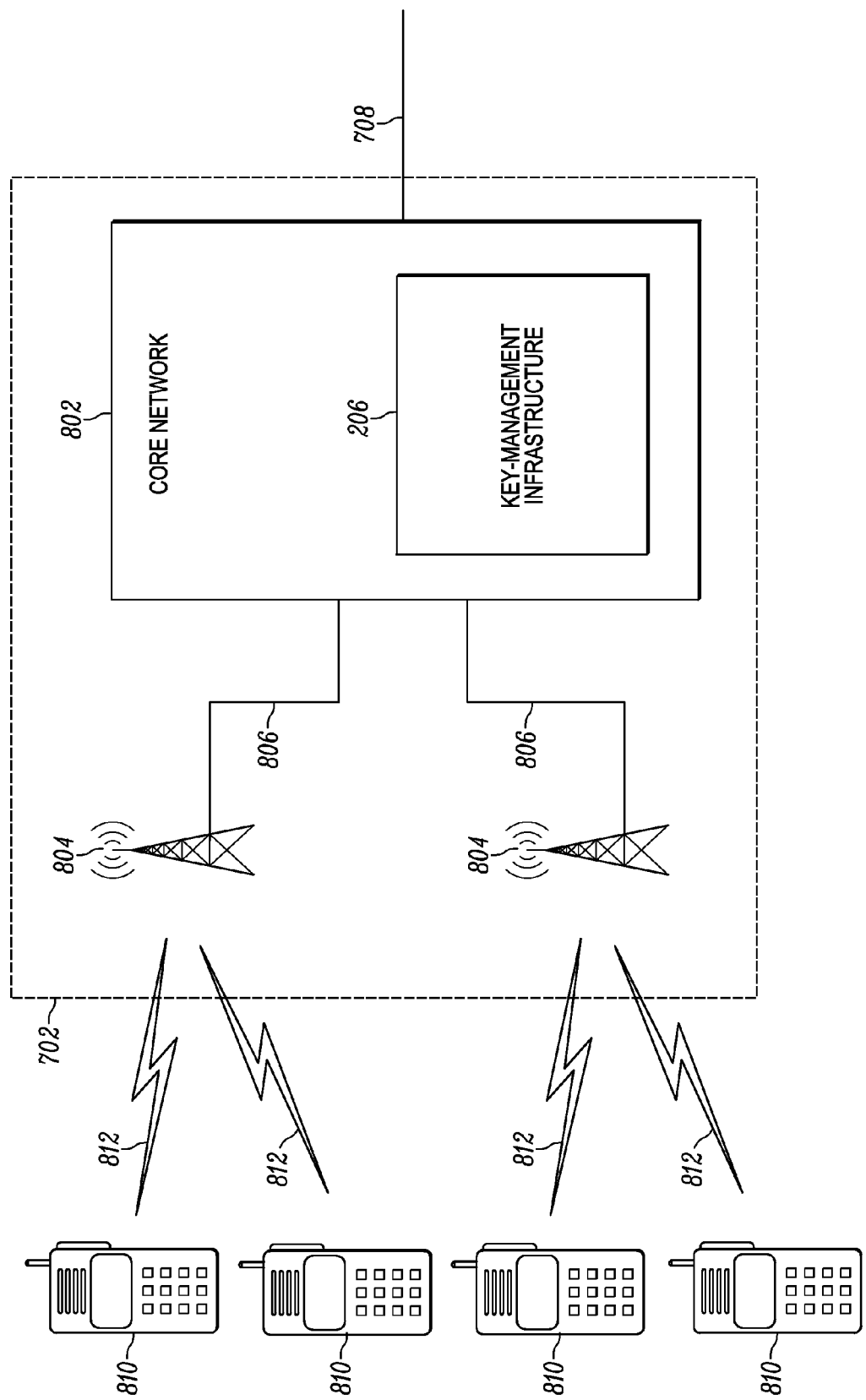
FIG. 8 depicts an example radio access network (RAN), in accordance with at least one embodiment.

FIG. 8 depicts an example of RAN 702, in accordance with at least one embodiment. As shown, RAN 702 includes a core network 802, which communicates directly or indirectly with one or more base stations 804 over one or more communication links 806. As is the case with each of the links mentioned above, and as is the case with any of the communication links mentioned anywhere else in this disclosure, communication links 806 may take the form of (or include) one or more wireless-communication links and/or one or more wired-communication links, as deemed suitable by those of skill in the relevant art in a given context.

In at least one embodiment, a given base station 804 includes the hardware and software (and/or firmware) necessary for the base station to function as a NodeB, an eNodeB, a BTS, a Wi-Fi access point, and/or any other type of base station, as known to those having skill in the relevant art. In some instances, base station 804 in RAN 702 may also include functionality typically associated in the art with entities that are often referred to by terms such as base station controllers (BSCs), radio network controllers (RNCs), and the like. Any suitable number of base stations could be deployed as deemed suitable by those of skill in the relevant art.

In general, a respective base station 804 may be any entity that, on one side (i.e., the wireless-network side (interface)), engages in wireless communication over respective air interfaces 812 with one or more mobile radios 810 according to a protocol such as P25 or the like and, on the other side (i.e., the "backhaul" side), engages in communications with core network 802 via one or more communication links 806, to facilitate communications between various mobile radios such as mobile radios 810 and networks and/or network entities (such as network 704, network entity 704, and/or key-generating authority 204, among other examples).

Core network 802 may include one or more network entities such as one or more key-management entities (such as KMI 206), mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to mobile radios 810 via base stations 804, and to bridge such wireless service with various transport networks. In general, RAN 702 may provide wireless service according to a protocol such as P25, LTE, Wi-Fi, and/or the like. These examples are provided for illustration and not by way of limitation; moreover, those of skill in the relevant art are aware of variations among different protocols and among different implementations of a given protocol, and of similarities across different protocols.

Air-interface links 812 may each include a respective downlink and a respective uplink. Any one or more of the downlinks and/or uplinks may take the form of respective air-interface channels and could be modulated using TDMA, FDMA, and/or Quadrature Phase-Shift Keying (QPSK), among numerous other examples known to those of skill in the relevant art. A respective downlink channel could (though need not) take the form of a shared channel, and could provide one or more of a circuit-mode-data service, a packet-mode-data service, and/or a Short Data Service (SDS) (i.e., a Short Message Service (SMS)), among numerous other examples known to those of skill in the relevant art. Communication over a given channel may be addressed to a single mobile radio using an identifier uniquely associated with that single mobile radio and/or to multiple mobile radios (e.g., in a manner similar to that described above with respect to direct-mode communication).

Mobile radios 810 may be any suitable computing and communication devices configured to engage in wireless communication with one or more base stations 804 over respective air interfaces 812, as is known to those in the relevant art. Some example mobile radios and wireless-communication links are discussed throughout this detailed description with reference to various figures. It is explicitly noted that mobile radios that communicate via one or more RANs may also be capable of communicating directly with one another. Thus, while mobile radios that are capable of engaging in communication via one or more RANs could certainly carry out and embody the present methods and systems, mobile radios that are capable of both direct-mode and RAN-based communication could certainly carry out and embody the present methods and systems as well.

Figure 9:
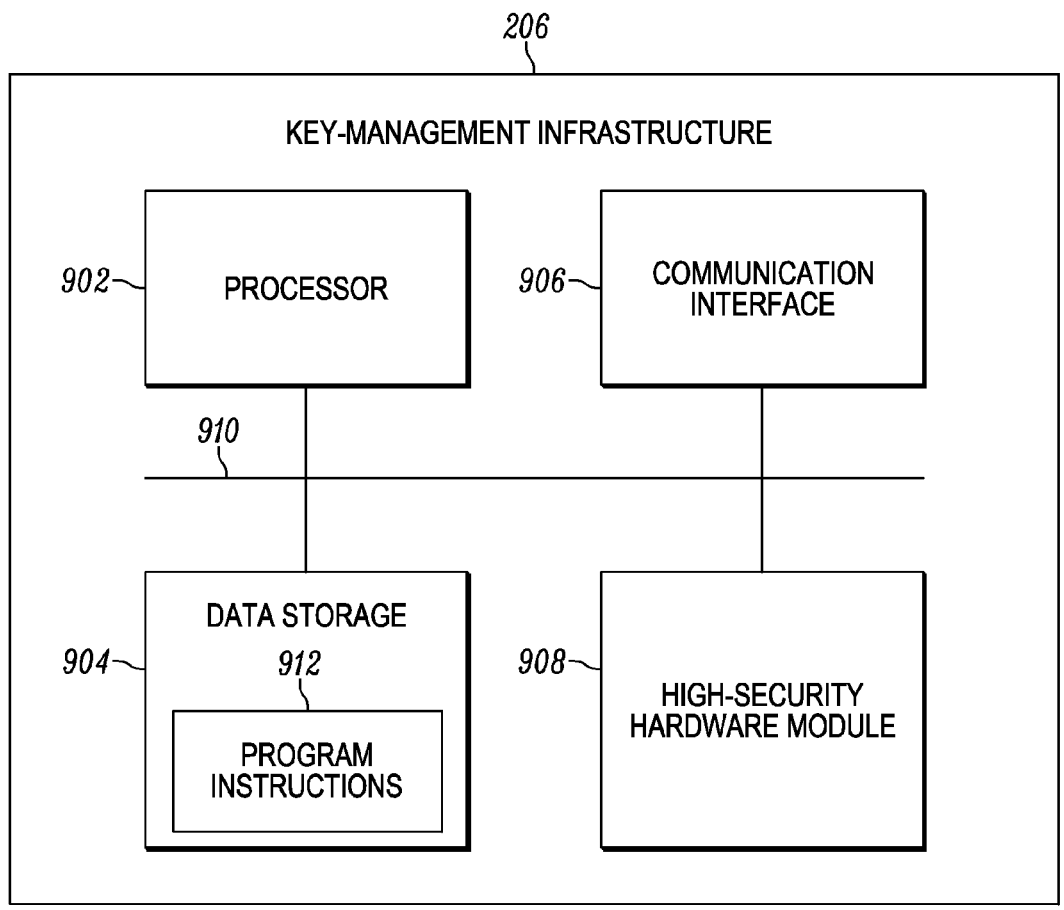
FIG. 9 depicts an example KMI, in accordance with at least one embodiment.

FIG. 9 depicts an example KMI, in accordance with at least one embodiment. As shown, KMI 206 includes a processor 902, data storage 904, a communication interface 906, and a high-security hardware module 908, each of which are interconnected via a system bus 910. Those having skill in the relevant art will appreciate that KMI 206 could have additional and/or different components, and perhaps a different arrangement of components, among many other possible variations that could be listed here, and that KVL 208, base station 210, and/or mobile radio 212 could take a form similar to KMI 206.

Processor 902 may include one or more processors of any type deemed suitable by those of skill in the relevant art, some examples including a microprocessor and a dedicated digital signal processor (DSP).

Data storage 904 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 9, data storage 904 contains program instructions 912 executable by processor 902 for carrying out various functions, though data storage 904 may contain different and/or additional data (such as one or more cryptographic keys).

In an embodiment in which KMI 206 is configured to carry out one or more processes and/or functions (such as the processes and functions described with reference to FIGS. 1 and 3), program instructions 912 are executable by processor 902 for carrying out those functions. In instances where other entities described herein have a structure similar to that of the example KMI 206 that is described in connection with at least FIG. 9, the respective program instructions 912 stored by the respective data storages 904 of those respective devices are executable by their respective processors 902 to carry out functions performed by those devices.

Communication interface 906 may include (i) one or more wireless-communication interfaces for communicating according to one or more of the wireless-communication types and/or protocols mentioned above, and/or one or more other types and/or protocols deemed suitable by those having skill in the relevant art for a given implementation or in a given context and/or (ii) one or more wired-communication interfaces for communicating according to one or more types and/or protocols such as Ethernet, USB, and the like, and/or one or more other types and/or protocols deemed suitable by those having skill in the relevant art for a given implementation or in a given context. As such, communication interface 906 may include any necessary hardware (e.g., chipsets, antennas, Ethernet cards, etc.), any necessary firmware, and any necessary software for conducting one or more forms of communication with one or more other entities.

Figure 10:
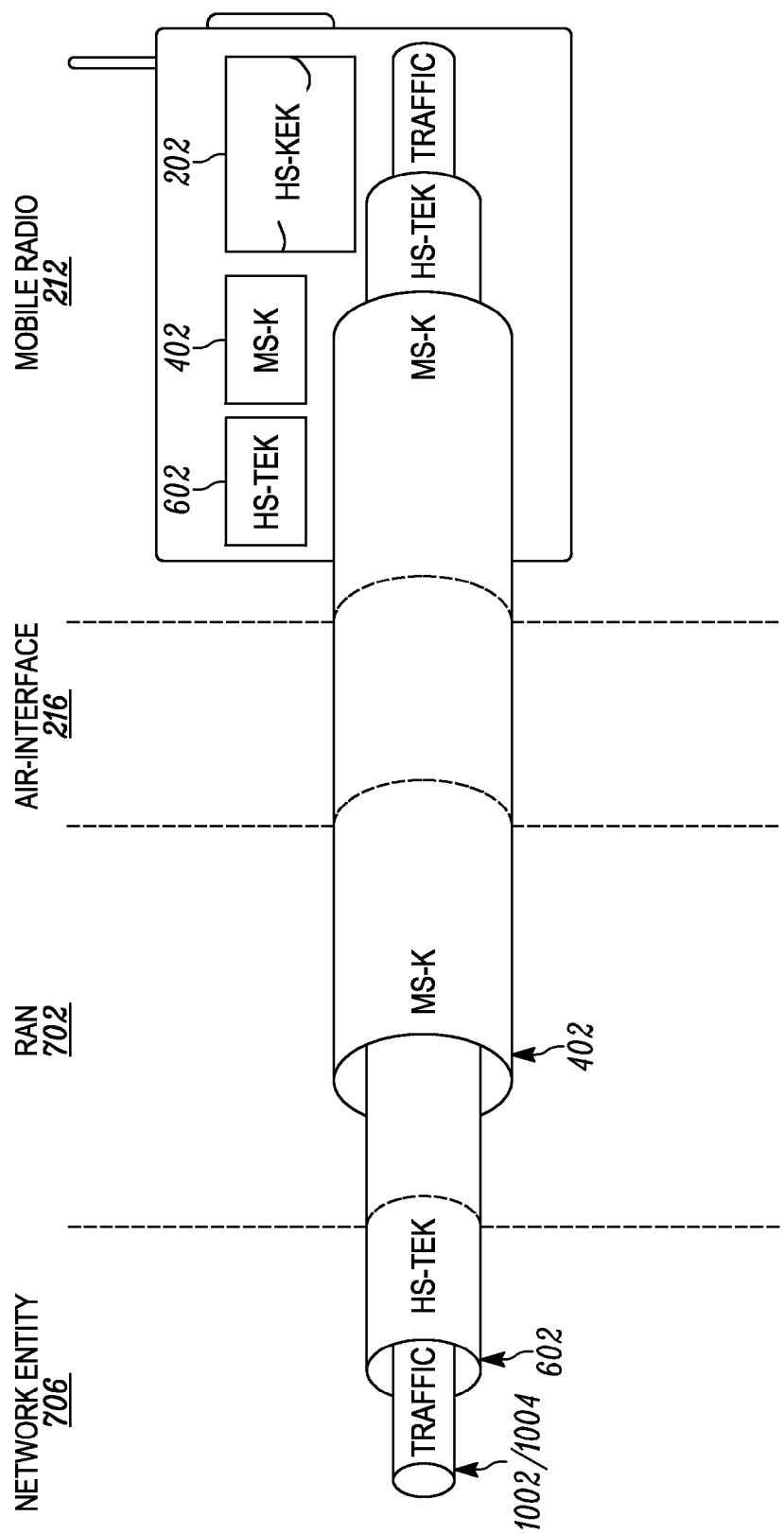
FIG. 10 depicts an example of a RAN exchanging encrypted data with a mobile radio over an air interface, in accordance with various embodiments.

FIG. 10 depicts an example of RAN 702 exchanging high-security traffic with mobile radio 212 over air interface 216, in accordance with at least one embodiment. As shown, RAN 702 receives inbound high-security traffic 1002 (that is encrypted based on HS-K TEK 602) and forwards the inbound high-security traffic to mobile radio 212 over air interface 216. Additionally, RAN 702 receives outbound high-security traffic 1004 (that is encrypted based on an HS-TEK 602) from mobile radio 212 over air interface 216 and forwards the outbound high-security traffic (perhaps via a packet-data connection and/or other connection). And though FIG. 10 depicts high-security traffic 1002 and 1004 as being encrypted based on HS-TEK 602, those of skill in the art will appreciate that the high-security traffic may be encrypted based on different and/or additional HS-Ks. Further, though FIG. 10 depicts RAN 702 as receiving inbound high-security traffic 1002 from network entity 704, those of skill in the art will appreciate that inbound high-security traffic 1002 may be received from entities other than network entity 704. Similarly, RAN 702 needn't forward outbound high-security traffic 1004 to the same entity from which inbound high-security traffic 1002 was received, and in some embodiments may forward outbound high-security traffic 1004 to entities different from (and/or in addition to) network entity 704.

High-security traffic exchanged between RAN 702 and mobile radio 212 could (though needn't) be further encrypted based on one or more MS-Ks. In the embodiment illustrated in FIG. 10, RAN 702 generates medium-security-encrypted inbound high-security traffic at least in part by encrypting received inbound high-security traffic 1002 based on the at least one MS-K 402. In at least one such embodiment, forwarding inbound high-security traffic 1002 to mobile radio 212 includes RAN 702 forwarding the medium-security-encrypted inbound high-security traffic to the mobile radio. Similarly, receiving outbound high-security traffic 1004 from mobile radio 212 may include RAN 702 receiving medium-security-encrypted outbound high-security traffic. In at least one embodiment, RAN 702 decrypts (based on the at least one MS-K 402) the received medium-security-encrypted outbound high-security traffic and forwards outbound high-security traffic 1004 via a packet-data connection and/or other connection. And certainly numerous other possible example implementations could be described.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method carried out by a key-management infrastructure, the method comprising:
   receiving first and second disassembly products of a high-security cryptographic key; and
   providing the first and second disassembly products to a mobile radio for reassembly of the high-security cryptographic key,
   wherein providing the first disassembly product to the mobile radio comprises providing the first disassembly product to the mobile radio over a local connection via a restricted-access key variable loader, and
   wherein providing the second disassembly product to the mobile radio comprises:
      generating a medium-security-encrypted second disassembly product at least in part by encrypting the second disassembly product based on at least one medium-security cryptographic key; and
      providing the medium-security-encrypted second disassembly product to the mobile radio over an air interface.

2. The method of claim 1, wherein:
   the key-management infrastructure comprises an Association of Public-Safety Communications Officials-International (APCO) Project 25 (P25) key-management facility, and
   the method being carried out by the key-management infrastructure comprises the method being carried out by the APCO P25 key-management facility.

3. The method of claim 1, wherein:
   the first disassembly product comprises a random number, and
   the second disassembly product is based on both the high-security cryptographic key and the random number.

4. The method of claim 3, wherein the second disassembly product comprises an XOR of the high-security cryptographic key and the random number.

5. The method of claim 1, further comprising confirming that the mobile radio is authorized to receive the high-security cryptographic key prior to completing the providing of both the first and second disassembly products to the mobile radio.

6. The method of claim 1, wherein:
   the at least one medium-security cryptographic key comprises a medium-security traffic encryption key (MS-TEK), and
   encrypting the second disassembly product based on the at least one medium-security cryptographic key comprises encrypting the second disassembly product based on the MS-TEK.

7. The method of claim 6, wherein:
   the at least one medium-security cryptographic key further comprises a medium-security key encryption key (MS-KEK), and
   encrypting the second disassembly product based on the MS-TEK comprises encrypting the second disassembly product based on both the MS-KEK and the MS-TEK.

8. The method of claim 7, wherein encrypting the second disassembly product based on both the MS-KEK and the MS-TEK comprises:
   generating a first encryption result at least in part by encrypting the second disassembly product based on the MS-KEK; and
   encrypting the first encryption result based on the MS-TEK.

9. The method of claim 1, wherein:
   the at least one medium-security cryptographic key comprises a medium-security key encryption key (MS-KEK), and
   encrypting the second disassembly product based on the at least one medium-security cryptographic key comprises encrypting the second disassembly product based on the MS-KEK.

10. The method of claim 1, wherein the high-security cryptographic key comprises a high-security key encryption key (HS-KEK).

11. The method of claim 10, further comprising:
   receiving a high-security traffic encryption key (HS-TEK) that is encrypted based on the HS-KEK; and
   providing the high-security-encrypted HS-TEK to the mobile radio over the air interface for decryption by the mobile radio based on the HS-KEK.

12. The method of claim 11, further comprising:
   encrypting the HS-TEK based on at least one medium-security cryptographic key prior to providing the HS-TEK to the mobile radio over the air interface.

13. The method of claim 11, wherein a radio access network (RAN) comprises the key-management infrastructure, the method further comprising the RAN:
   receiving inbound high-security traffic that is encrypted based on the HS-TEK;
   generating medium-security-encrypted inbound high-security traffic at least in part by encrypting the received inbound high-security traffic based on at least one medium-security cryptographic key; and
   forwarding the medium-security-encrypted inbound high-security traffic over the air interface to the mobile radio.

14. The method of claim 11, wherein a radio access network (RAN) comprises the key-management infrastructure, the method further comprising the RAN:

receiving medium-security-encrypted outbound high-security traffic over the air interface from the mobile radio, the outbound high-security traffic being encrypted based on the HS-TEK;

decrypting the received medium-security-encrypted outbound high-security traffic based on at least one medium-security cryptographic key; and forwarding the outbound high-security traffic via a packet-data connection.

15. The method of claim 1, wherein the high-security cryptographic key comprises a high-security traffic encryption key (HS-TEK).

16. The method of claim 15, wherein a radio access network (RAN) comprises the key-management infrastructure, the method further comprising the RAN:

receiving inbound high-security traffic that is encrypted based on the HS-TEK;

generating medium-security-encrypted inbound high-security traffic at least in part by encrypting the received inbound high-security traffic based on at least one medium-security cryptographic key; and forwarding the medium-security-encrypted inbound high-security traffic over the air interface to the mobile radio.

17. The method of claim 15, wherein a radio access network (RAN) comprises the key-management infrastructure, the method further comprising the RAN:

receiving medium-security-encrypted outbound high-security traffic over the air interface from the mobile radio, the outbound high-security traffic being encrypted based on the HS-TEK;

decrypting the received medium-security-encrypted outbound high-security traffic based on at least one medium-security cryptographic key; and forwarding the outbound high-security traffic via a packet-data connection.

18. The method of claim 1, further comprising, prior to providing the medium-security-encrypted second disassembly product to the mobile radio over the air interface:

generating a storage-encrypted second disassembly product at least in part by encrypting the second disassembly product based on a storage cryptographic key;

storing the storage-encrypted second disassembly product in a cryptographic key storage;

retrieving the storage-encrypted second disassembly product from the cryptographic key storage; and decrypting the storage-encrypted second disassembly product based on the storage cryptographic key.

19. The method of claim 1, wherein:

the mobile radio comprises a high-security hardware module, and providing the first and second disassembly products to the mobile radio for reassembly of the high-security cryptographic key comprises providing the first and second disassembly products to the high-security hardware module.

20. A key-management infrastructure comprising:

a communication interface;

a processor; and a non-transitory data storage medium containing instructions executable by the processor for causing the key-management infrastructure to carry out a set of functions, the set of functions including:

receiving first and second disassembly products of a high-security cryptographic key; and providing the first and second disassembly products to a mobile radio for reassembly of the high-security cryptographic key, wherein providing the first disassembly product to the mobile radio comprises providing the first disassembly product to the mobile radio over a local connection via a restricted-access key variable loader, wherein providing the second disassembly product to the mobile radio comprises:

generating a medium-security-encrypted second disassembly product at least in part by encrypting the second disassembly product based on at least one medium-security cryptographic key; and providing the medium-security-encrypted second disassembly product to the mobile radio over an air interface.

* * * * *